(12) United States Patent
Balogh

(10) Patent No.: US 7,723,972 B1
(45) Date of Patent: May 25, 2010

(54) REDUCING SOFT START DELAY AND PROVIDING SOFT RECOVERY IN POWER SYSTEM CONTROLLERS

(75) Inventor: Laszlo Balogh, Merrimack, NH (US)

(73) Assignee: Fairchild Semiconductor Corporation, South Portland, ME (US)

( * ) Notice: Subject to any disclaimer, the term of this patent is extended or adjusted under 35 U.S.C. 154(b) by 236 days.

(21) Appl. No.: 12/077,475

(22) Filed: Mar. 19, 2008

(51) Int. Cl.
*G05F 1/40* (2006.01)

(52) U.S. Cl. ..................................... 323/282

(58) Field of Classification Search ............... 323/222, 323/223, 238, 268, 271, 282, 285, 288, 349–351; 363/49, 50, 52, 53
See application file for complete search history.

(56) References Cited

U.S. PATENT DOCUMENTS

| | | | |
|---|---|---|---|
| 3,491,252 | A | 1/1970 | Petrohilos |
| 3,555,399 | A | 1/1971 | Buchanan et al. |
| 3,840,797 | A | 10/1974 | Aggen et al. |
| 3,916,224 | A | 10/1975 | Daniels et al. |
| 4,072,965 | A | 2/1978 | Kondo |
| 4,143,282 | A | 3/1979 | Berard, Jr. et al. |
| 4,228,493 | A | 10/1980 | de Sarte et al. |
| 4,236,198 | A | 11/1980 | Ohsawa et al. |
| 4,495,554 | A | 1/1985 | Simi et al. |
| 4,559,590 | A | 12/1985 | Davidson |
| 4,622,627 | A | 11/1986 | Rodriquez et al. |
| 4,695,936 | A | 9/1987 | Whittle |
| 4,706,176 | A | 11/1987 | Kettschau |
| 4,706,177 | A | 11/1987 | Josephson |
| 4,720,641 | A | 1/1988 | Faini |
| 4,725,769 | A | 2/1988 | Cini et al. |
| 4,734,839 | A | 3/1988 | Barthold |
| 4,739,462 | A | 4/1988 | Farnsworth et al. |
| 4,806,844 | A | 2/1989 | Claydon et al. |

(Continued)

FOREIGN PATENT DOCUMENTS

EP  0 651 440 A1  5/1995

(Continued)

OTHER PUBLICATIONS

R. Brucker, et al., "Optimizing Converter Design and Performance Utilizing Micro Controller System Feedback and Control," Proceedings of Powercon 8, E-2, pp. 1-10, 1981.

(Continued)

*Primary Examiner*—Matthew V Nguyen
(74) *Attorney, Agent, or Firm*—Sidley Austin LLP

(57) ABSTRACT

In one embodiment, a method is provided for reducing soft-start delay and ensuring soft recovery from a short circuit or brown out condition in a power converter. The method includes: providing a feedback signal indicative of the output voltage of the power system at a first input terminal of an error amplifier; providing a soft-start reference voltage at a second input terminal of the error amplifier; comparing the feedback signal against the soft-start reference voltage to generate a control signal for regulating an output voltage of the power converter; sourcing current for pre-charging a soft-start capacitor associated with the soft-start reference voltage, thereby reducing soft-start delay; and sinking current for discharging the soft-start capacitor in the event of a short circuit or brown out condition, thereby providing soft recovery after short circuit or brown out events.

15 Claims, 1 Drawing Sheet

U.S. PATENT DOCUMENTS

| | | |
|---|---|---|
| 4,809,148 A | 2/1989 | Barn |
| 4,811,184 A | 3/1989 | Koninsky et al. |
| 4,814,674 A | 3/1989 | Hrassky |
| 4,858,094 A | 8/1989 | Barlage |
| 4,862,339 A | 8/1989 | Inou et al. |
| 4,866,590 A | 9/1989 | Odaka et al. |
| 4,870,555 A | 9/1989 | White |
| 4,887,199 A | 12/1989 | Whittle |
| 4,888,497 A | 12/1989 | Dallabora et al. |
| 4,890,210 A | 12/1989 | Myers |
| 4,928,220 A | 5/1990 | White |
| 4,937,728 A | 6/1990 | Leonardi |
| 4,943,903 A | 7/1990 | Cardwell, Jr. |
| 4,943,907 A | 7/1990 | Godwin |
| 5,012,401 A | 4/1991 | Barlage |
| 5,014,178 A | 5/1991 | Balakrishnan |
| 5,021,937 A | 6/1991 | Cohen |
| 5,034,871 A | 7/1991 | Okamoto et al. |
| 5,041,956 A | 8/1991 | Marinus |
| 5,072,353 A | 12/1991 | Feldtkeller |
| 5,086,364 A | 2/1992 | Leipold et al. |
| 5,146,394 A | 9/1992 | Ishii et al. |
| 5,161,098 A | 11/1992 | Balakrishnan |
| 5,177,408 A | 1/1993 | Marques |
| 5,200,886 A | 4/1993 | Schwartz et al. |
| 5,245,526 A | 9/1993 | Balakrishnan et al. |
| 5,297,014 A | 3/1994 | Saito et al. |
| 5,313,381 A | 5/1994 | Balakrishnan |
| 5,394,017 A | 2/1995 | Catano et al. |
| 5,452,195 A | 9/1995 | Lehr et al. |
| 5,461,303 A | 10/1995 | Leman et al. |
| 5,481,178 A | 1/1996 | Wilcox et al. |
| 5,508,602 A | 4/1996 | Borgato et al. |
| 5,528,131 A | 6/1996 | Marty et al. |
| 5,552,746 A | 9/1996 | Danstrom |
| 5,563,534 A | 10/1996 | Rossi et al. |
| 5,568,084 A | 10/1996 | McClure et al. |
| 5,570,057 A | 10/1996 | Palara |
| 5,572,156 A | 11/1996 | Diazzi et al. |
| 5,617,016 A | 4/1997 | Borghi et al. |
| 5,619,403 A | 4/1997 | Ishikawa et al. |
| 5,621,629 A | 4/1997 | Hemminger et al. |
| 5,640,317 A | 6/1997 | Lei |
| 6,617,833 B1 * | 9/2003 | Xi ............................ 323/282 |
| 6,737,841 B2 * | 5/2004 | Wrathall .................... 323/282 |
| 7,352,162 B1 * | 4/2008 | Chang et al. ............... 323/290 |

FOREIGN PATENT DOCUMENTS

| | | |
|---|---|---|
| EP | 0 694 966 A1 | 1/1996 |
| EP | 0 736 957 A1 | 10/1996 |
| EP | 0 740 491 A1 | 10/1996 |
| EP | 0 748 034 A1 | 12/1996 |
| EP | 0 748 035 A1 | 12/1996 |
| EP | 0 751 621 A1 | 1/1997 |
| WO | WO 83/01157 | 3/1983 |

OTHER PUBLICATIONS

A.J. Bowen, et al., Power Supply with Optical Isolator, IBM Technical Disclosure Bulletin, vol. 14, No. 11, pp. 3320, Apr. 1972.

A. Halperin, "Primary Regulated Dual Power Supply," IBM Technical Disclosure Bulletin, vol. 21, No. 10, pp. 4299-4300, Mar. 1979.

H.S. Hoffman, Jr., et al., "Proportional Drive Supply with Diversion Control," IBM Technical Disclosure Bulletin, vol. 21, No. 12, pp. 4904-4905, May 1979.

D. Azzis, et al., "Flyback on Card Power Supply," IBM Technical Disclosure Bulletin, vol. 23, No. 4, pp. 1477-1478, Sep. 1980.

B. Pelly, et al., "Power MOSFETs Take the Load Off Switching Supply Design," Electronic Design, pp. 135-139, Feb. 1983.

"5-W DC-DC Converters Aim at Telecomm Applications," Electronic Design, vol. 31, No. 15, p. 227, Aug. 1985.

"Combined Switch-Mode Power Amplifier and Supply," IBM Technical Disclosure Bulletin, vol. 28, No. 3, pp. 1193-1195, Aug. 1985.

"Off-Line Power Supply Control Technique Using a Single Transformer to Back Three Control Signals," IBM Technical Disclosure Bulletin, vol. 32, No. 8A, Jan. 1990, pp. 272-273, Jan. 1990.

H.S. Hoffman, Jr., "Self-Generated Bias Supply," IBM Technical Disclosure Bulletin, vol. 20, No. 5, pp. 1814-1815, Oct. 1997.

* cited by examiner

REDUCING SOFT START DELAY AND PROVIDING SOFT RECOVERY IN POWER SYSTEM CONTROLLERS

BACKGROUND

1. Field of Invention

The present invention relates to power conversion, and more particularly, to reducing soft start delay and providing soft recovery in power system controllers.

2. Description of Related Art

Power converters are essential for many modern electronic devices. Among other capabilities, a power converter can adjust voltage level downward (buck converter and its derivatives) or adjust voltage level upward (boost converter and its derivatives). A power converter may also convert from alternating current (AC) power to direct current (DC) power, or vice versa. A power converter may also function to provide an output at a regulated level (e.g., 5.0V). Power converters are typically implemented using one or more switching devices, such as transistors, which are turned on and off to deliver power to the output of the converter. Control circuitry is provided to regulate the turning on and off of the switching devices, and thus, these converters are known as "switching regulators" or "switching converters." Such a power converter may be incorporated into or used to implement a power supply—i.e., a switching mode power supply (SMPS). The power converters may also include one or more capacitors or inductors for alternately storing and outputting energy.

Some power converters may employ a soft-start circuit in order to begin operation after power on. The soft-start circuit may have a soft-start capacitor which must be charged to a predetermined voltage before the power converter delivers any power to a load. If the charging of the soft-start capacitor is slow, then power delivery is delayed.

Also, some power converters may employ a closed-loop feedback with an error amplifier to regulate output voltage. The closed loop operation maintains the error amplifier of the power converter in its linear operating mode to actively control the output voltage of the power converter to follow a reference voltage $V_{REF}$ at the non-inverting input of the error amplifier. A short circuit or brown-out condition may cause a significant drop in the value of the output voltage. If the error amplifier reference voltage $V_{REF}$ is independent from the feedback voltage, recovery after a short circuit or brown-out condition is usually followed by significant overshoot in the output voltage since the error amplifier is railed during these events and need to recover. Such overshoot in the output voltage is an undesired phenomenon in power supplies.

SUMMARY

Briefly and generally, embodiments of the invention include systems and related methods to reduce soft start delays in power system controllers in power supplies with pre-charged output capacitors and to provide soft recovery after short circuit or brown-out conditions.

According to an embodiment of the present invention, a system is provided for reducing soft-start delay and recovery time from a short circuit or brown out condition in a power converter. The system includes an error amplifier having a first input terminal and a second input terminal. The error amplifier receives a feedback signal indicative of the output voltage of the power system at its first input terminal, and receives a soft-start reference voltage at its second input terminal. The error amplifier is operable to compare the feedback signal against the soft-start reference voltage to generate a control signal for regulating an output voltage of the power converter. Circuitry, coupled to the first input terminal of the error amplifier, establishes a range around the feedback signal and forces the soft-start reference voltage to stay within the range around the feedback signal. Circuitry, coupled to the second input terminal of the error amplifier, pre-charges a soft-start capacitor associated with the soft-start reference voltage, thereby reducing soft-start delay.

According to another embodiment of the present invention, a system is provided for reducing soft-start delay and ensuring soft recovery from a short circuit or brown out condition in a power converter. The system includes an error amplifier having a first input terminal and a second input terminal. The error amplifier receives a feedback signal indicative of the output voltage of the power system at the first input terminal, and receives a soft-start reference voltage at the second input terminal. The error amplifier is operable to compare the feedback signal against the soft-start reference voltage to generate a control signal for regulating an output voltage of the power converter. A first clamp, having a first input terminal and a second input terminal, receives the soft-start reference voltage at its second input terminal. The first clamp is operable to source current for pre-charging a soft-start capacitor associated with the soft-start reference voltage, thereby reducing soft-start delay. A second clamp, coupled to the soft-start capacitor, has a first input terminal and a second input terminal. The second clamp receives the soft-start reference voltage at its second input terminal. The second clamp is operable to sink current for discharging the soft-start capacitor in the event of a short circuit or brown out condition.

According to yet another embodiment of the present invention, a method is provided for reducing soft-start delay and to ensure soft recovery from a short circuit or brown out condition in a power converter. The method includes: providing a feedback signal indicative of the output voltage of the power system at a first input terminal of an error amplifier; providing a soft-start reference voltage at a second input terminal of the error amplifier; comparing the feedback signal against the soft-start reference voltage to generate a control signal for regulating an output voltage of the power converter; sourcing current for pre-charging a soft-start capacitor associated with the soft-start reference voltage, thereby reducing soft-start delay; and sinking current for discharging the soft-start capacitor in the event of a short circuit or brown out condition.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Figure 1:
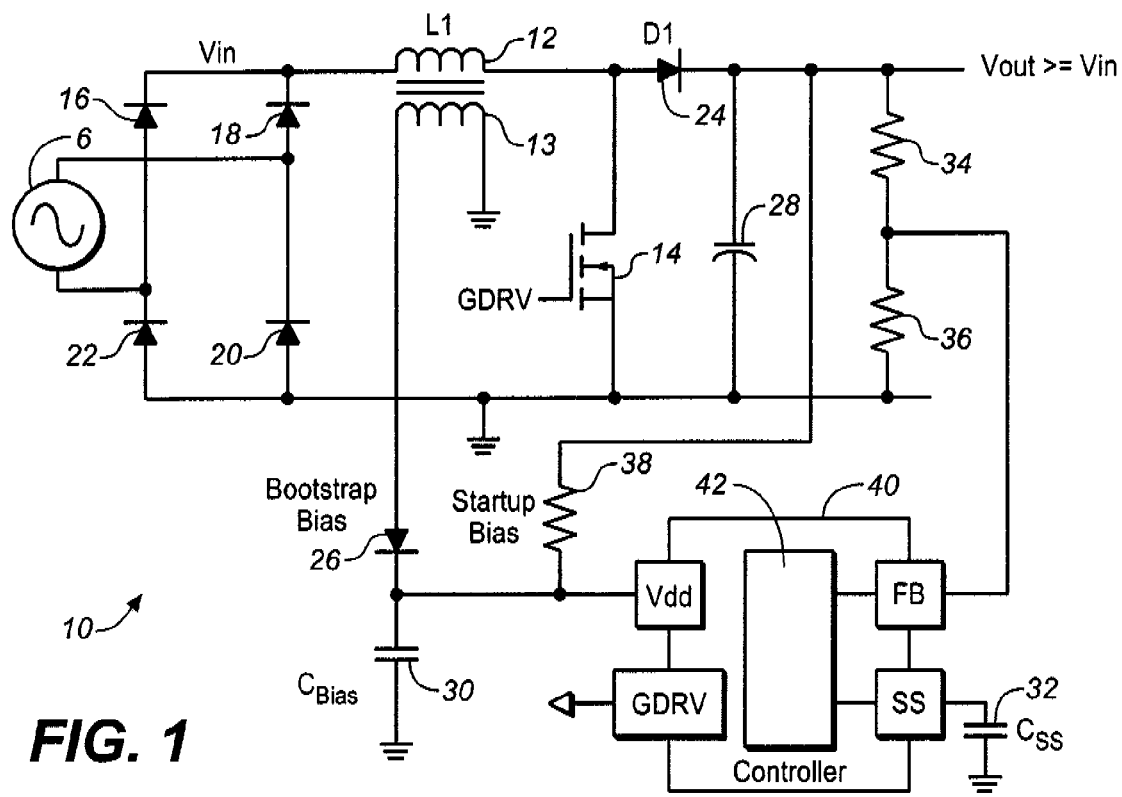
FIG. 1 is a schematic diagram in partial block form of an exemplary implementation of a power converter system, according to an embodiment of the invention.
Figure 2:
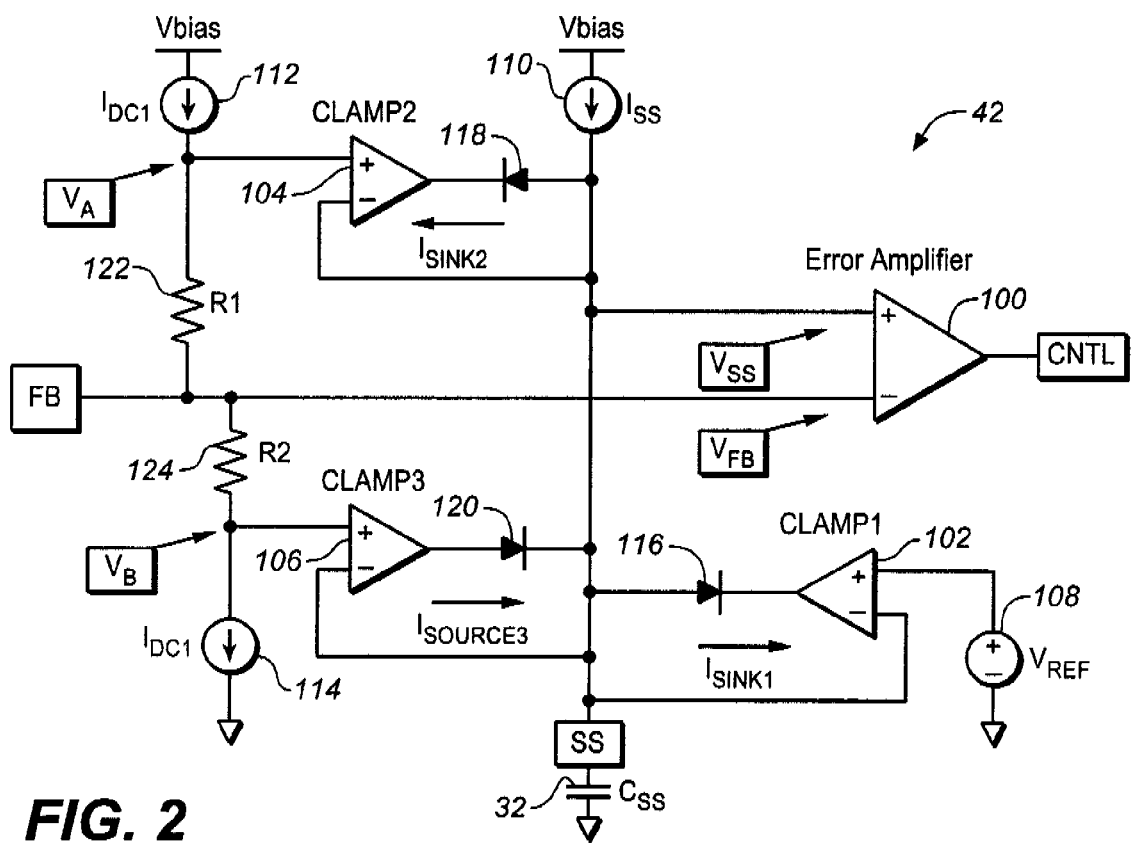
FIG. 2 is a schematic diagram of an exemplary implementation of a circuit for eliminating soft start delay and providing soft recovery, according to an embodiment of the invention.

Embodiments of the present invention and their advantages are best understood by referring to FIGS. 1 and 2 of the drawings. Like numerals are used for like and corresponding parts of the various drawings.

In various embodiments, the present invention provides systems and related methods to reduce soft start delays in power system controllers in power supplies with pre-charged output capacitors and to provide soft recovery after short circuit or brown-out conditions FIG. 1 is a schematic diagram in partial block form of an exemplary implementation of a power converter system 10, according to an embodiment of the invention. Power converter system 10 can convert an alternating current (AC) power to direct current (DC) power, and thus, is an AC/DC converter. Power converter 10 receives the AC power from an AC power source 6 at an input having a first terminal (P) and a second terminal (N). The power converter system 10 delivers boosted DC voltage to a load at an output terminal Vout. The power converter system 10 may have better performance than previous designs, because it includes circuitry for reducing soft start delays and providing soft recovery (e.g., with no or minimal overshoot) after short circuit or brown-out conditions.

As shown, power converter system 10 includes an inductor 12, winding 13, switch 14, diodes 16, 8, 20, 22, 24, 26, capacitors 28, 30, 32, resistors 34, 36, 38, and controller 40. The diodes 16, 18, 20, and 22 are coupled to the AC power source 6 at the input side of the power converter system 10. As used herein, the terms "coupled" or "connected," or any variant thereof, covers any coupling or connection, either direct or indirect, between two or more elements. The diodes 16, 18, 20, and 22 implement rectifier circuitry for rectifying the input side AC power. Switch 14, inductor 12, diode 24, and capacitor 28 provide or support the boost function. Switch 14 is turned on and off by a control signal GDRV so that capacitor 28 charges. Switch 14 may be implemented as a metal-oxide-semiconductor field effect transistor (MOSFET), but it is understood that this transistor can be implemented with any other suitable device such as, for example, an insulated gate bipolar transistor (IGBT), insulated gate field effect transistor (IGFET), bipolar junction transistor (BJT), etc.

Controller 40 generates the control signal GDRV for controlling the switch 14. Winding 13, diode 26, capacitor 30, and resistor 38 implement circuitry for providing Vdd supply power for controller 40. Winding 13 is magnetically coupled to inductor 12, which allows bias capacitor 30 to be charged for providing Vdd supply. Capacitor 32 functions as a soft start (SS) capacitor for controller 40. At start-up of power converter system 10, capacitor 32 begins charging. When the voltage on capacitor 32 reaches a particular value, the controller 40 will output signals to cause power converter system 10 to deliver power to the load. Controller 40 receives a feedback signal $V_{FB}$ for the output voltage Vout at a node between resistors 34 and 36. Resistors 34 and 36 implement a resistor network and are coupled in series, for example, between output voltage $V_{OUT}$ for the power converter and ground (GND). The resistor network divides the value of the output voltage Vout and provides it as feedback at a terminal or pin FB of controller 40. The feedback signal $V_{FB}$ allows controller 40 to detect short circuits or brown out conditions at Vout.

Controller 40 includes circuitry 42 for reducing soft start delays and provide soft recovery after short circuit or brown-out conditions, as discussed in further detail herein.

In various embodiments, all or a portion of power converter system 10 shown in FIG. 1 can be implemented on a single or multiple semiconductor dies (commonly referred to as a "chip") or discrete components. Each die is a monolithic structure formed from, for example, silicon or other suitable material. For implementations using multiple dies or components, the dies and components can be assembled on a printed circuit board (PCB) having various traces for conveying signals therebetween. In one embodiment, for example, controller 40 can be provided on a single chip or die, or on one or more separate die, and the remaining components of system 10 are implemented as discrete components.

FIG. 2 is a schematic diagram of an exemplary implementation of circuitry 42 for reducing soft start delay and providing soft recovery, according to an embodiment of the invention. The circuitry 42 includes an error amplifier 100. The error amplifier 100 has an inverting (−) terminal and a non-inverting (+) terminal. The inverting (−) terminal of error amplifier 100 is coupled to receive the feedback signal $V_{FB}$. The non-inverting (+) terminal is coupled to the soft-start capacitor 32 and receives the soft-start voltage signal $V_{SS}$ as a reference voltage. The value of soft-start voltage signal $V_{SS}$ can vary with time. The error amplifier 100 compares the feedback signal $V_{FB}$ against the reference voltage $V_{SS}$, and in response, outputs a control signal CNTL. The control signal CNTL may be provided for controlling a pulse width modulator (PWM) (not shown) which is located between the error amplifier 100 and the switch 14. The PWM outputs the GDRV signal which controls the switch 14 for regulating output voltage of the power converter system 10.

Usually the feedback voltage signal $V_{FB}$ of a power converter is independent from the reference voltage of the error amplifier. The circuitry 42 establishes a "window" around the feedback signal $V_{FB}$ and forces the voltage reference $V_{SS}(t)$ of the error amplifier 100 to stay within that window. This reduces soft start delay and providing for soft recovery (e.g., with no or minimal overshoot) of the power converter system 10 after short circuit or brown-out conditions.

At start-up, the power converter system 10 does not deliver any power until the voltage on the soft-start capacitor 32 exceeds the voltage of the feedback signal $V_{FB}$. The circuitry 42 quickly pre-charges the soft-start capacitor 32 to the feedback voltage level so power delivery can be initiated much faster. With pre-charged output capacitor 28 (e.g., in a power factor correction (PFC) or DC/DC converter application starting up into a powered back plane), the soft-start time can be significantly reduced and closed loop operation maintained by pre-charging the soft start capacitor 32. Thus, with the circuitry 42 and associated method, a larger value soft-start capacitor 32 can be used without imposing excessive delay during start-up. Furthermore, a lower value bias capacitor 30 can be used. This is because circuitry 42 reduces the need for a larger capacitor that would otherwise be necessary for maintaining charge during the period between undervoltage lockout (UVLO) and the starting of switching.

In other words, controller 40 is in UVLO while bias capacitor 30 is charging. Once bias capacitor 30 has charged to the UVLO turn-on threshold, the controller 40 turns on. Controller 40 will begin to output the GDRV pulse signals to start delivering output power to the load when the voltage on the soft-start capacitor 32 exceeds the voltage of the feedback signal $V_{FB}$. Circuitry 42 helps to reduce the time for charging up the soft-start capacitor 32.

While the soft-start capacitor 32 is charging, bias power for the controller 40 is provided by the bias capacitor 30. There is a direct relationship between the time that is needed to charge the soft-start capacitor 32 and the size of the bias capacitor 30. If more time is needed to charge the soft-start capacitor 32, then the size of the bias capacitor 30 must be larger in order to provide power to the controller 40. Once switching commences in power converter system 10, transformer 13 provides bias power (through diode 26) for the controller 40.

After a short circuit or brown-out condition, the circuitry 42 allows the power converter system 10 to recover softly just like at initial start-up. Typically, such short circuit or brown-out events result in significant drop in output voltage Vout. In previous designs, the error amplifier reference voltage is independent from the feedback voltage, which causes significant output voltage overshoot after recovery since the error amplifier is railed during these events. In contrast, the circuitry 42 and associated method, according to embodiments of the present invention, establish the "window" for the reference voltage $V_{SS}$ around the value of feedback signal $V_{FB}$. As such, the error amplifier reference will follow the feedback voltage (drop) and will recover using the same soft start mechanism used at initial start up. Thus, circuitry 42 eliminates or significantly reduces overshoot after short circuit or brown-out events.

As depicted, in this implementation, circuitry 42 includes clamps 102, 104, 106, voltage source 108, current sources 110, 112, 114, diodes 116, 118, 120, and resistors 122, 124. Each of clamps 102, 104, and 106 can be implemented as an operational amplifier with an inverting (−) terminal and a non-inverting (+) terminal. In other implementations, other circuitry can be used.

Current source 112 and resistor 122 (labeled R1) are in series coupled between Vbias and the node for feedback signal $V_{FB}$. Resistor 124 (labeled R2) and current source 114 are coupled in series between the node for feedback signal $V_{FB}$ and ground (GND). In some embodiments, the current sources 112, 114 have the same value ($I_{DC1}$). Resistors 122, 124 and current sources 112, 114 create the "window" around $V_{FB}$ ranging from a voltage $V_A$ to a voltage $V_B$. $V_A$ is the first or upper voltage limit and is the voltage at the node between current source 112 and resistor 122. $V_B$ is the second or lower voltage limit and is the voltage at the node between resistor 124 and current source 114.

The reference voltage $V_{SS}$ for the error amplifier 100 will stay within this voltage range from $V_A$ to $V_B$, where:

$$V_A = V_{FB} + I_{DC1} * R1; \text{ and}$$

$$V_B = V_{FB} - I_{DC1} * R2.$$

In one embodiment, $V_A$ is always 100 mV above feedback signal $V_{FB}$, and $V_B$ is always 100 mV below feedback signal $V_{FB}$. Since the current through resistor 122 equals the current through resistor 124, the feedback accuracy is not compromised. No current flows in or out the FB pin.

The window limits the maximum deviation between reference voltage $V_{SS}$ and feedback signal $V_{FB}$, which allows the power converter system 10 to have better performance than prior designs. In particular, by limiting the deviation between reference voltage $V_{SS}$ and feedback signal $V_{FB}$, the power converter system 10 achieves shorter start-up time (time between UVLO and first pulse) and soft recovery after short circuit or brown-out condition.

Clamp 106 (labeled CLAMP3) has its non-inverting (+) terminal coupled to receive the voltage $V_B$ and its inverting (−) terminal coupled to the soft-start (SS) pin. The output of clamp 106 is coupled to the soft-start pin. Clamp 106 functions to quickly charge the soft-start capacitor 32. Clamp 106 may be a source-only buffer—i.e., it only sources current. Clamp 106 outputs a current $I_{SOURCE3}$, which can be much greater than the current from current source 110 (labeled $I_{SS}$).

At start up for power converter system 10, the value of the feedback voltage signal is much greater than the value of the soft-start voltage on the capacitor 32, which is zero volt (i.e., $V_{FB} >> V_{SS} = 0V$) due to the presence of output voltage Vout. In PFC applications, the rectified peak line voltage is present; in powered backplane/parallel/redundant applications, other active power supplies provide the voltage at the output of the power supply to be started up. Clamp 106 quickly charges the soft-start capacitor 32 to a value slightly below that of the feedback voltage $V_{FB}$ (i.e., $V_{SS} = V_B = V_{FB} - I_{DC1} * R2$). From this level, the current source 110 takes over charging the soft-start capacitor 32, and normal soft start can quickly commence. This is in contrast to previous designs, where charging the soft-start capacitor to the pre-existing feedback voltage level would take a relatively long time, especially in PFC applications where the soft start interval can be 100 ms or greater.

Clamp 102 (labeled CLAMP1) has its non-inverting (+) terminal coupled to the voltage source 108 to receive a reference voltage $V_{REF}$ and its inverting (−) terminal coupled to the soft-start (SS) pin. Clamp 102 functions as a current sink to sink a current $I_{SINK1}$ from the start-up capacitor through diode 116. Clamp 102 prevents charging of the start-up capacitor 32 beyond the value of reference voltage $V_{REF}$. Reference voltage $V_{REF}$ is the steady state value of $V_{SS}$ voltage providing the reference voltage for the error amplifier 100 in normal operation (i.e., $V_{FB} = V_{SS} = V_{REF}$ in regulation).

Clamp 104 (labeled CLAMP2) has its non-inverting (+) terminal coupled to receive the voltage $V_A$ and its inverting (−) terminal coupled to the soft-start (SS) pin. Clamp 104 functions as a current sink to sink a current $I_{SINK2}$ from the start-up capacitor through diode 118. If the output voltage Vout drops (e.g., in the event of a short circuit or brown out condition), the feedback voltage $V_{FB}$ drops as well. Clamp 104 discharges the start-up capacitor 32 back to the level of the feedback voltage $V_{FB}$ in such event.

After start-up, power converter system 10 is in normal operation. During normal operation, the conditions for proper operation of the circuitry 42 are as follows:

$$|I_{SINK2}| > |I_{SS}|; \text{ and}$$

$$|I_{SINK1}| > |I_{SS} + I_{SOURCE3}|.$$

The clamp 104 will not sink current at the same time as clamp 106 is sourcing current because there is always a difference between voltage $V_A$ and voltage $V_B$ (i.e., $I_{SINK2}$ and $I_{SOURCE3}$ will not be active at the same time because $(V_A - V_B) = I_{DC1} * (R1+R2) > 0$ all the time).

In normal operation, the feedback voltage $V_{FB}$ and the voltage $V_{SS}$ on the soft start capacitor will be equal to the reference voltage $V_{REF}$ (i.e., $V_{FB} = V_{SS} = V_{REF}$). In circuitry 42, the first or upper voltage limit $V_A$ will be greater than the voltage $V_{SS}$ on the soft start capacitor, which means that clamp 104 will not be sinking any current (i.e., $I_{SINK2} = 0$). The second or lower voltage limit $V_B$ will be less than the voltage $V_{SS}$ on the soft start capacitor, which means that clamp 106 will not be sourcing any current (i.e., $I_{SOURCE3} = 0$). The current being sunk by clamp 102 will be equal to the current output by current source 110 (i.e., $I_{SINK1} = I_{SS}$). Controller 40 controls the switch 14 during normal operation to deliver power to the load of power converter system 10 at the output voltage Vout terminal.

During operation, negative and positive output voltage transients may appear at the output voltage Vout of the power converter system 10 terminal due to, for example, changes in the load. In the circuitry 42, any negative output voltage transients reflected at the feedback pin FB should be less than $I_{DC1} * R1$. Thus, the voltage $V_{SS}$ on the soft-start capacitor 32 is not pulled down by clamp 104 during the negative output voltage transient. Circuitry 42 is insensitive to positive output voltage transients because the magnitude of the current sunk by clamp 102 is greater than the magnitude of the sum of the current output by current source 110 and the current sourced by clamp 106 (i.e., $|I_{SINK1}|>|I_{SS}+I_{SOURCE3}|$). This means that voltage $V_{SS}$ on the soft-start capacitor 32 can not be pulled above the reference voltage $V_{REF}$. Accordingly, during transients, the circuitry 42 is inactive, and therefore does not impact transient behavior.

If a short circuit or brown-out condition occurs in power converter system 10, the output voltage Vout falls. The falling output voltage is followed at the feedback pin FB for circuitry 42. When the first or upper voltage limit falls below the reference voltage $V_{REF}$, then clamp 104 pulls the voltage $V_{SS}$ on the soft-start capacitor 32 low. As a result, the voltage $V_{SS}$ will be equal to the sum of the feedback voltage $V_{FB}$ and the voltage across resistor 122 (i.e., $V_{SS}=V_{FB}+I_{DC1}*R1$). Since this value will be greater than the feedback voltage $V_{FB}$, the error amplifier 100 outputs a value for control signal CNTL to cause more power to be delivered, thereby recovering the output. When recovering from short circuit or brown-out conditions, the $V_{SS}<V_{REF}$ conditions are substantially similar to that for soft-start. Error amplifier 100 recovers while output voltage Vout is rising. The voltage loop becomes active and over shoot can be significantly reduced or eliminated.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A system for reducing soft-start delay and providing soft recovery from a short circuit or brown out condition in a power converter, the system comprising:
    an error amplifier having a first input terminal and a second input terminal, the error amplifier receiving a feedback signal indicative of the output voltage of the power system at its first input terminal, the error amplifier receiving a soft-start reference voltage at its second input terminal, the error amplifier operable to compare the feedback signal against the soft-start reference voltage to generate a control signal for regulating an output voltage of the power converter;
    circuitry coupled to the first input terminal of the error amplifier for establishing a range around the feedback signal and forcing the soft-start reference voltage to stay within the range around the feedback signal; and
    circuitry coupled to the second input terminal of the error amplifier for pre-charging a soft-start capacitor associated with the soft-start reference voltage, thereby reducing soft-start delay.

2. The system of claim 1 comprising a first clamp coupled to the soft-start capacitor, the first clamp having a first input terminal and a second input terminal, the first clamp receiving a reference voltage at the its input terminal, the first clamp receiving the soft-start reference voltage at its second input terminal, the first clamp operable to sink current from the soft-start capacitor to prevent the soft-start capacitor from charging beyond the reference voltage.

3. The system of claim 1 comprising a second clamp coupled to the soft-start capacitor, the second clamp having a first input terminal and a second input terminal, the second clamp coupled at its first input terminal to the circuitry for establishing a range around the feedback signal and forcing the soft-start reference voltage to stay within the range around the feedback signal, the second clamp receiving the soft-start reference voltage at its second input terminal, the second clamp operable to sink current for discharging the soft-start capacitor in the event of a short circuit or brown out condition.

4. The system of claim 1 wherein the circuitry for pre-charging the soft-start capacitor comprises a third clamp having a first input terminal and a second input terminal, the third clamp coupled at its first input terminal to the circuitry for establishing a range around the feedback signal and forcing the soft-start reference voltage to stay within the range around the feedback signal, the third clamp receiving the soft-start reference voltage at its second input terminal, the third clamp operable to source current for pre-charging the soft-start capacitor.

5. The system of claim 1 wherein the circuitry for establishing a range around the feedback signal and forcing the soft-start reference voltage to stay within the range around the feedback signal comprises:
    a first current source and a first resistor coupled between a supply voltage and the first input terminal of the error amplifier for defining a first voltage limit for the range; and
    a second current source and a second resistor coupled between the first input terminal of the error amplifier and ground for defining a second voltage limit for the range.

6. The system of claim 5 wherein the circuitry for pre-charging the soft-start capacitor comprises a first clamp having a first input terminal and a second input terminal, the first clamp receiving the second voltage limit at its first input terminal, the first clamp receiving the soft-start reference voltage at its second input terminal, the first clamp operable to source current for pre-charging the soft-start capacitor.

7. The system of claim 1 wherein at least part of the system is implemented on an integrated circuit.

8. A system for reducing soft-start delay and providing soft recovery from a short circuit or brown out condition in a power converter, the system comprising:
    an error amplifier having a first input terminal and a second input terminal, the error amplifier receiving a feedback signal indicative of the output voltage of the power system at the first input terminal, the error amplifier receiving a soft-start reference voltage at the second input terminal, the error amplifier operable to compare the feedback signal against the soft-start reference voltage to generate a control signal for regulating an output voltage of the power converter;
    a first clamp having a first input terminal and a second input terminal, the first receiving the soft-start reference voltage at its second input terminal, the first clamp operable to source current for pre-charging a soft-start capacitor associated with the soft-start reference voltage, thereby reducing soft-start delay; and
    a second clamp coupled to the soft-start capacitor, the second clamp having a first input terminal and a second input terminal, the second clamp receiving the soft-start reference voltage at its second input terminal, the second clamp operable to sink current for discharging the soft-start capacitor in the event of a short circuit or brown out condition.

9. The system of claim 8 comprising a third clamp coupled to the soft-start capacitor, the third clamp having a first input terminal and a second input terminal, the third clamp receiving a reference voltage at the its input terminal, the third clamp receiving the soft-start reference voltage at its second input terminal, the third clamp operable to sink current from the soft-start capacitor to prevent the soft-start capacitor from charging beyond the reference voltage.

10. The system of claim 8 comprising circuitry coupled to the first input terminal of the error amplifier for establishing a range around the feedback signal and forcing the soft-start reference voltage to stay within the range around the feedback signal.

11. The system of claim 10 wherein the circuitry for establishing a range around the feedback signal and forcing the soft-start reference voltage to stay within the range around the feedback signal comprises:
   a first current source and a first resistor coupled between a supply voltage and the first input terminal of the error amplifier for defining a first voltage limit for the range; and
   a second current source and a second resistor coupled between the first input terminal of the error amplifier and ground for defining a second voltage limit for the range.

12. A method for reducing soft-start delay and providing soft recovery from a short circuit or brown out condition in a power converter, the method comprising:
   providing a feedback signal indicative of the output voltage of the power system at a first input terminal of an error amplifier;
   providing a soft-start reference voltage at a second input terminal of the error amplifier;
   comparing the feedback signal against the soft-start reference voltage to generate a control signal for regulating an output voltage of the power converter;
   sourcing current for pre-charging a soft-start capacitor associated with the soft-start reference voltage, thereby reducing soft-start delay; and
   sinking current for discharging the soft-start capacitor in the event of a short circuit or brown out condition.

13. The method of claim 12 wherein the first input terminal of the error amplifier is an inverting terminal and the second input terminal of the error amplifier is a non-inverting terminal.

14. The method of claim 12 comprising:
   establishing a range around the feedback signal; and
   forcing the soft-start reference voltage to stay within the range around the feedback signal.

15. The method of claim 14 wherein establishing a range around the feedback signal comprises:
   defining a first voltage limit for the range; and
   defining a second voltage limit for the range.

\* \* \* \* \*